(12) United States Patent
Barrus

(10) Patent No.: US 10,248,556 B2
(45) Date of Patent: Apr. 2, 2019

(54) FORWARD-ONLY PAGED DATA STORAGE MANAGEMENT WHERE VIRTUAL CURSOR MOVES IN ONLY ONE DIRECTION FROM HEADER OF A SESSION TO DATA FIELD OF THE SESSION

(71) Applicant: EXABLOX CORPORATION, Sunnyvale, CA (US)

(72) Inventor: Frank E. Barrus, New Ipswich, NH (US)

(73) Assignee: EXABLOX CORPORATION, Sunnyvale, CA (US)

( * ) Notice: Subject to any disclaimer, the term of this patent is extended or adjusted under 35 U.S.C. 154(b) by 0 days.

(21) Appl. No.: 14/055,662

(22) Filed: Oct. 16, 2013

(65) Prior Publication Data

US 2015/0106579 A1 Apr. 16, 2015

(51) Int. Cl.
G06F 12/02 (2006.01)
G06F 3/06 (2006.01)
G06F 17/30 (2006.01)

(52) U.S. Cl.
CPC .......... *G06F 12/0223* (2013.01); *G06F 3/061* (2013.01); *G06F 3/0655* (2013.01); *G06F 3/0676* (2013.01); *G06F 17/30* (2013.01); *G06F 2212/1016* (2013.01)

(58) Field of Classification Search
None
See application file for complete search history.

(56) References Cited

U.S. PATENT DOCUMENTS

| 4,656,604 | A | | 4/1987 | van Loon | |
|---|---|---|---|---|---|
| 4,660,130 | A | * | 4/1987 | Bartley et al. | ................ 711/209 |
| 5,057,996 | A | * | 10/1991 | Cutler | ....................... G06F 9/52 |
| | | | | | 718/106 |
| 5,420,999 | A | | 5/1995 | Mundy | |
| 5,561,778 | A | | 10/1996 | Fecteau et al. | |

(Continued)

FOREIGN PATENT DOCUMENTS

| EP | 1285354 | 2/2003 |
|---|---|---|
| EP | 2575379 | 4/2013 |

(Continued)

OTHER PUBLICATIONS

Office Action, dated Nov. 5, 2013, U.S. Appl. No. 13/441,715, filed Apr. 6, 2012.

(Continued)

*Primary Examiner* — Baboucarr Faal
*Assistant Examiner* — Chie Yew
(74) *Attorney, Agent, or Firm* — Maschoff Brennan

(57) ABSTRACT

Computer-implemented methods and systems for managing data in one or more data storage media are provided. An example method may comprise creating a data structure within the data storage media. The data structure includes a plurality of memory pages, each page comprising a plurality of sessions, and each session comprising a header and a plurality of data objects. The method also comprises enabling writing data to the data storage medium, in response to routine requests, such that the data is recorded to the one or more data objects nearest the current location of a virtual cursor. When a data management operation is performed, the virtual cursor is moved within a single page in a single direction.

23 Claims, 8 Drawing Sheets

(56) References Cited

U.S. PATENT DOCUMENTS

| | | | |
|---|---|---|---|
| 5,717,919 A * | 2/1998 | Kodavalla | G06F 17/30339 |
| 5,950,205 A * | 9/1999 | Aviani, Jr. | G06F 12/123 |
| 6,098,079 A * | 8/2000 | Howard | G06F 17/30097 |
| 6,154,747 A | 11/2000 | Hunt | |
| 6,167,437 A | 12/2000 | Stevens et al. | |
| 6,314,435 B1 | 11/2001 | Wollrath et al. | |
| 6,356,916 B1 | 3/2002 | Yamatari et al. | |
| 6,480,950 B1 | 11/2002 | Lyubashevskiy et al. | |
| 6,772,162 B2 | 8/2004 | Waldo et al. | |
| 6,839,823 B1 * | 1/2005 | See | G06F 12/023 711/103 |
| 7,043,494 B1 | 5/2006 | Joshi et al. | |
| 7,177,980 B2 | 2/2007 | Milillo et al. | |
| 7,197,622 B2 | 3/2007 | Torkelsson et al. | |
| 7,266,555 B1 | 9/2007 | Coates et al. | |
| 7,293,140 B2 | 11/2007 | Kano | |
| 7,392,421 B1 | 6/2008 | Bloomstein et al. | |
| 7,403,961 B1 | 7/2008 | Deepak et al. | |
| 7,454,592 B1 | 11/2008 | Shah et al. | |
| 7,509,360 B2 | 3/2009 | Wollrath et al. | |
| 7,539,836 B1 | 5/2009 | Klinkner | |
| 7,685,109 B1 | 3/2010 | Ransil et al. | |
| 7,725,437 B2 | 5/2010 | Kirshenbaum et al. | |
| 7,827,218 B1 | 11/2010 | Mittal | |
| 7,895,666 B1 * | 2/2011 | Eshghi | G06F 17/30958 705/25 |
| 7,990,979 B2 | 8/2011 | Lu et al. | |
| 8,019,882 B2 | 9/2011 | Rao et al. | |
| 8,099,605 B1 * | 1/2012 | Billsrom et al. | 713/187 |
| 8,132,168 B2 | 3/2012 | Wires et al. | |
| 8,239,584 B1 | 8/2012 | Rabe et al. | |
| 8,364,887 B2 | 1/2013 | Wong et al. | |
| 8,407,438 B1 | 3/2013 | Ranade | |
| 8,447,733 B2 | 5/2013 | Sudhakar | |
| 8,572,290 B1 | 10/2013 | Mukhopadhyay et al. | |
| 8,868,926 B2 | 10/2014 | Hunt et al. | |
| 9,009,202 B2 | 4/2015 | Patterson | |
| 9,043,567 B1 | 5/2015 | Modukuri et al. | |
| 2002/0069340 A1 | 6/2002 | Tindal et al. | |
| 2002/0087590 A1 | 7/2002 | Bacon et al. | |
| 2002/0147700 A1 * | 10/2002 | Webber | G06F 17/30958 |
| 2003/0028514 A1 | 2/2003 | Lord et al. | |
| 2003/0028585 A1 | 2/2003 | Yeager et al. | |
| 2003/0056139 A1 | 3/2003 | Murray et al. | |
| 2003/0072259 A1 | 4/2003 | Mor | |
| 2003/0101173 A1 | 5/2003 | Lanzatella et al. | |
| 2003/0115408 A1 | 6/2003 | Milillo et al. | |
| 2004/0093361 A1 | 5/2004 | Therrien et al. | |
| 2004/0111610 A1 * | 6/2004 | Slick | H04L 63/0428 713/160 |
| 2004/0158588 A1 | 8/2004 | Pruet | |
| 2004/0167898 A1 | 8/2004 | Margolus et al. | |
| 2005/0071335 A1 | 3/2005 | Kadatch | |
| 2005/0080928 A1 | 4/2005 | Beverly et al. | |
| 2005/0081041 A1 | 4/2005 | Hwang | |
| 2005/0083759 A1 * | 4/2005 | Wong | G06F 12/0246 365/222 |
| 2005/0138271 A1 * | 6/2005 | Bernstein | G06F 12/0246 711/103 |
| 2005/0160170 A1 | 7/2005 | Schreter | |
| 2005/0256972 A1 | 11/2005 | Cochran et al. | |
| 2006/0039371 A1 | 2/2006 | Castro et al. | |
| 2006/0083247 A1 | 4/2006 | Mehta | |
| 2006/0156396 A1 | 7/2006 | Hochfield et al. | |
| 2006/0271540 A1 | 11/2006 | Williams | |
| 2006/0271604 A1 * | 11/2006 | Shoens | G06F 17/30088 |
| 2007/0005746 A1 | 1/2007 | Roe et al. | |
| 2007/0088907 A1 * | 4/2007 | Wong | G06F 12/02 711/103 |
| 2007/0130232 A1 | 6/2007 | Therrien et al. | |
| 2007/0203960 A1 | 8/2007 | Guo | |
| 2007/0230368 A1 | 10/2007 | Shi et al. | |
| 2007/0233828 A1 | 10/2007 | Gilbert | |
| 2007/0271303 A1 | 11/2007 | Menendez et al. | |
| 2007/0276838 A1 | 11/2007 | Abushanab et al. | |
| 2007/0276843 A1 | 11/2007 | Lillibridge et al. | |
| 2008/0005624 A1 | 1/2008 | Kakivaya et al. | |
| 2008/0016507 A1 | 1/2008 | Thomas et al. | |
| 2008/0052446 A1 * | 2/2008 | Lasser | G06F 12/0246 711/103 |
| 2008/0126434 A1 | 5/2008 | Uysal et al. | |
| 2008/0133893 A1 | 6/2008 | Glew | |
| 2008/0147872 A1 | 6/2008 | Regnier | |
| 2008/0170550 A1 | 7/2008 | Liu et al. | |
| 2008/0183973 A1 | 7/2008 | Aguilera et al. | |
| 2008/0243879 A1 | 10/2008 | Gokhale et al. | |
| 2008/0243938 A1 | 10/2008 | Kottomtharayil et al. | |
| 2008/0244199 A1 | 10/2008 | Nakamura et al. | |
| 2008/0292281 A1 * | 11/2008 | Pecqueur et al. | 386/124 |
| 2009/0049240 A1 | 2/2009 | Oe et al. | |
| 2009/0100212 A1 * | 4/2009 | Boyd | G06F 3/0613 711/5 |
| 2009/0172139 A1 | 7/2009 | Wong et al. | |
| 2009/0198927 A1 * | 8/2009 | Bondurant et al. | 711/161 |
| 2009/0199041 A1 | 8/2009 | Fukui et al. | |
| 2009/0307292 A1 | 12/2009 | Li et al. | |
| 2009/0327312 A1 | 12/2009 | Kakivaya et al. | |
| 2010/0023941 A1 | 1/2010 | Iwamatsu et al. | |
| 2010/0031000 A1 | 2/2010 | Flynn et al. | |
| 2010/0036862 A1 | 2/2010 | Das et al. | |
| 2010/0114336 A1 | 5/2010 | Konieczny et al. | |
| 2010/0114905 A1 | 5/2010 | Slavik et al. | |
| 2010/0122330 A1 | 5/2010 | McMillan et al. | |
| 2010/0161817 A1 | 6/2010 | Xiao et al. | |
| 2010/0172180 A1 | 7/2010 | Paley et al. | |
| 2010/0191783 A1 | 7/2010 | Mason et al. | |
| 2010/0217953 A1 | 8/2010 | Beaman et al. | |
| 2010/0228798 A1 | 9/2010 | Kodama et al. | |
| 2010/0262797 A1 | 10/2010 | Rosikiewicz et al. | |
| 2010/0318645 A1 | 12/2010 | Hoole et al. | |
| 2010/0332456 A1 | 12/2010 | Prahlad et al. | |
| 2011/0026439 A1 | 2/2011 | Rollins | |
| 2011/0029711 A1 | 2/2011 | Dhuse et al. | |
| 2011/0034176 A1 | 2/2011 | Lord et al. | |
| 2011/0060918 A1 | 3/2011 | Troncoso Pastoriza et al. | |
| 2011/0106795 A1 | 5/2011 | Maim | |
| 2011/0138123 A1 | 6/2011 | Gurajada et al. | |
| 2011/0213754 A1 | 9/2011 | Bindal et al. | |
| 2011/0231374 A1 | 9/2011 | Jain et al. | |
| 2011/0231524 A1 | 9/2011 | Lin et al. | |
| 2011/0264712 A1 | 10/2011 | Ylonen | |
| 2011/0264989 A1 | 10/2011 | Resch et al. | |
| 2011/0271007 A1 | 11/2011 | Wang et al. | |
| 2012/0011337 A1 | 1/2012 | Aizman | |
| 2012/0030260 A1 | 2/2012 | Lu et al. | |
| 2012/0030408 A1 | 2/2012 | Flynn et al. | |
| 2012/0047181 A1 | 2/2012 | Baudel | |
| 2012/0060072 A1 | 3/2012 | Simitci et al. | |
| 2012/0078915 A1 | 3/2012 | Darcy | |
| 2012/0096217 A1 * | 4/2012 | Son et al. | 711/103 |
| 2012/0147937 A1 | 6/2012 | Goss et al. | |
| 2012/0173790 A1 * | 7/2012 | Hetzler et al. | 711/103 |
| 2012/0179808 A1 | 7/2012 | Bergkvist et al. | |
| 2012/0179820 A1 | 7/2012 | Ringdahl et al. | |
| 2012/0185555 A1 | 7/2012 | Regni et al. | |
| 2012/0210095 A1 | 8/2012 | Nellans et al. | |
| 2012/0233251 A1 | 9/2012 | Holt et al. | |
| 2012/0278511 A1 | 11/2012 | Alatorre et al. | |
| 2012/0290535 A1 | 11/2012 | Patel et al. | |
| 2012/0290629 A1 | 11/2012 | Beaverson et al. | |
| 2012/0310892 A1 | 12/2012 | Dam et al. | |
| 2012/0323850 A1 | 12/2012 | Hildebrand et al. | |
| 2012/0331528 A1 | 12/2012 | Fu et al. | |
| 2013/0013571 A1 | 1/2013 | Sorenson, III et al. | |
| 2013/0041931 A1 | 2/2013 | Brand | |
| 2013/0054924 A1 * | 2/2013 | Dudgeon et al. | 711/170 |
| 2013/0067270 A1 | 3/2013 | Lee et al. | |
| 2013/0073821 A1 | 3/2013 | Flynn et al. | |
| 2013/0086004 A1 | 4/2013 | Chao et al. | |
| 2013/0091180 A1 | 4/2013 | Vicat-Blanc-Primet et al. | |
| 2013/0162160 A1 | 6/2013 | Ganton et al. | |
| 2013/0166818 A1 | 6/2013 | Sela | |
| 2013/0185508 A1 | 7/2013 | Talagala et al. | |

(56) References Cited

U.S. PATENT DOCUMENTS

| | | |
|---|---|---|
| 2013/0232313 A1 | 9/2013 | Patel et al. |
| 2013/0235192 A1 | 9/2013 | Quinn et al. |
| 2013/0246589 A1 | 9/2013 | Klemba et al. |
| 2013/0262638 A1 | 10/2013 | Kumarasamy et al. |
| 2013/0263151 A1 | 10/2013 | Li et al. |
| 2013/0268644 A1 | 10/2013 | Hardin et al. |
| 2013/0268770 A1 | 10/2013 | Hunt et al. |
| 2013/0282798 A1 | 10/2013 | McCarthy et al. |
| 2013/0288668 A1 | 10/2013 | Pragada et al. |
| 2013/0311574 A1 | 11/2013 | Lal |
| 2013/0346591 A1 | 12/2013 | Carroll et al. |
| 2013/0346839 A1 | 12/2013 | Dinha |
| 2014/0006580 A1 | 1/2014 | Raghu |
| 2014/0007178 A1 | 1/2014 | Gillum et al. |
| 2014/0019680 A1* | 1/2014 | Jin ................ G11B 5/012 711/112 |
| 2014/0059405 A1 | 2/2014 | Syu et al. |
| 2014/0143206 A1 | 5/2014 | Pittelko |
| 2014/0297604 A1 | 10/2014 | Brand |
| 2014/0317065 A1 | 10/2014 | Barrus |
| 2014/0335480 A1 | 11/2014 | Asenjo et al. |
| 2014/0351419 A1 | 11/2014 | Hunt et al. |
| 2014/0372490 A1 | 12/2014 | Barrus et al. |
| 2014/0379671 A1 | 12/2014 | Barrus et al. |
| 2015/0012763 A1 | 1/2015 | Cohen et al. |
| 2015/0019491 A1 | 1/2015 | Hunt et al. |
| 2015/0066524 A1 | 3/2015 | Fairbrothers et al. |
| 2015/0081964 A1 | 3/2015 | Kihara et al. |
| 2015/0106335 A1 | 4/2015 | Hunt et al. |
| 2015/0172114 A1 | 6/2015 | Tarlano et al. |
| 2015/0220578 A1 | 8/2015 | Hunt et al. |
| 2015/0222616 A1 | 8/2015 | Tarlano et al. |

FOREIGN PATENT DOCUMENTS

| | | |
|---|---|---|
| EP | 2834749 | 2/2015 |
| EP | 2834943 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 | 5/2016 |
| EP | 3020259 | 5/2016 |
| JP | 2004252663 A | 9/2004 |
| JP | 2008533570 | 8/2008 |
| JP | 2010146067 A | 7/2010 |
| JP | 2011095976 A | 5/2011 |
| JP | 2012048424 A | 3/2012 |
| WO | WO2013152357 | 10/2013 |
| WO | WO2013152358 | 10/2013 |
| WO | WO2014176264 | 10/2014 |
| WO | WO2014190093 | 11/2014 |
| WO | WO2014201270 | 12/2014 |
| WO | WO2014205286 | 12/2014 |
| WO | WO2015006371 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

Notice of Allowance, dated Mar. 27, 2014, U.S. Appl. No. 13/441,715, filed Apr. 6, 2012.
Office Action, dated Nov. 13, 2013, U.S. Appl. No. 13/441,592, filed Apr. 6, 2012.
Office Action, dated May 19, 2014, U.S. Appl. No. 13/441,592, filed Apr. 6, 2012.
Final Office Action, dated Nov. 20, 2014, U.S. Appl. No. 13/441,592, filed Apr. 6, 2012.
Advisory Action, dated Feb. 19, 2015, U.S. Appl. No. 13/441,592, filed Apr. 6, 2012.
International Search Report dated Aug. 6, 2013 5901PCT Application No. PCT/US2013/035675.
Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 5847PCT Application No. PCT/US2013/035673.
International Search Report dated Sep. 10, 2014 6362PCT Application No. PCT/US2014/035008.
Askitis, Nikolas et al., "HAT-trie: A Cache-conscious Trie-based Data Structure for Strings".
International Search Report dated Sep. 24, 2014 6342PCT Application No. PCT/US2014/039036.
International Search Report dated Oct. 22, 2014 6360PCT Application No. PCT/US2014/043283.
International Search Report dated Nov. 7, 2014 6361PCT Application No. PCT/US2014/042155.
International Search Report dated Jan. 1, 2015 6359PCT Application No. PCT/US2014/060176.
International Search Report dated Feb. 24, 2015 6359PCT Application No. PCT/US2014/060280.
International Search Report dated Mar. 4, 2015 6337PCT Application No. PCT/US2014/067110.
Non-Final Office Action, dated Jun. 24, 2015, U.S. Appl. No. 13/441,592, filed Apr. 6, 2012.
Non-Final Office Action, dated Aug. 11, 2015, U.S. Appl. No. 14/171,651, filed Feb. 3, 2014.
International Search Report dated Apr. 2, 2015 6340PCT Application No. PCT/US2014/045822.
International Sesarch Report dated May 14, 2015 6450PCT Application No. PCT/US2015/013611.
International Sesarch Report dated May 15, 2015 6341PCT Application No. PCT/US2015/014492.
Invitation pursuant to Rule 63(1) dated May 19, 2015 5847EP Application No. 13772293.0.
Extended European Search Report dated Aug. 4, 2015 5901EP Application No. 13771965.4.
Dabek et al. "Wide-area cooperative storage with CFS", Proceedings of the ACM Symposium on Operating Systems Principles, Oct. 1, 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1, 2001. pp. 149-160.
Office Action, dated May 17, 2016, U.S. Appl. No. 14/303,329, filed Jun. 12, 2014.
Final Office Action, dated Jun. 1, 2016, U.S. Appl. No. 14/284,351, filed May 21, 2014.
Final Office Action, dated Jun. 1, 2016, U.S. Appl. No. 14/171,651, filed Feb. 3, 2014.
Final Office Action, dated Jun. 2, 2016, U.S. Appl. No. 13/939,106, filed Jul. 10, 2013.
Advisory Action, dated Jul. 6, 2016, U.S. Appl. No. 13/939,106, filed Jul. 10, 2013.
Notice of Allowance, dated Jul. 14, 2016, U.S. Appl. No. 14/303,329, filed Jun. 12, 2014.
Non-Final Office Action, dated Jul. 25, 2016, U.S. Appl. No. 14/309,796, filed Jun. 19, 2014.
Final Office Action, dated Aug. 9, 2016, U.S. Appl. No. 14/105,099, filed Dec. 12, 2013.
Extended European Search Report dated Aug. 20, 2015 5847EP Application No. 13772293.0.
Office Action dated Mar. 15, 2016 in Japanese Patent Application No. 2015-504769 filed Apr. 8, 2013.
Joao, Jose et al., "Flexible Reference-Counting-Based Hardware Acceleration for Garbage Collection," Jun. 2009, ISCA '09: Proceedings of the 36th annual internaltional symposium on Computer Architecture, pp. 418-428.
Office Action dated Mar. 29, 2016 in Japanese Patent Application No. 2015-504768 filed Apr. 8, 2013.

(56) References Cited

OTHER PUBLICATIONS

Notice of Allowance dated Jul. 26, 2016 for Japanese Patent Application No. 2015-504768 filed Apr. 8, 2013.

* cited by examiner

FORWARD-ONLY PAGED DATA STORAGE MANAGEMENT WHERE VIRTUAL CURSOR MOVES IN ONLY ONE DIRECTION FROM HEADER OF A SESSION TO DATA FIELD OF THE SESSION

BACKGROUND

Technical Field

This disclosure relates generally to data processing, and more specifically, to forward-only paged data storage management.

Description of Related Art

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

Data processing speeds in computer systems are constantly increasing to meet the growing demands for new computing resources. However, there is also a strong demand for increasing the storage and memory addressing speeds to take full advantage of modern computer systems.

Today, many computer systems utilize various types of memory, such as a hard disk drive (HDD), solid state drive (SSD), random-access memory (RAM), and read-only memory (ROM). Unfortunately, some forms of memory often have a slower response time than any other components of a computing system. Thus, if a computing system utilizes a high performance processing unit, the overall performance may not be too high as the memory addressing speeds remain comparatively low. The reason for this is often not inherent limitations of the memory hardware, but rather the ways the data is written and read from the memory.

Certain data structures are can be used to organize data in memory units. These data structures may allow managing large amounts of data, such as, for example, large databases or internet indexing services. Some data structures may be better suited to certain applications. Some data structures are highly specialized and tailored to specific tasks.

Writing and reading data often involves a pointer. The pointer may be a virtual representation of a physical location in the memory space to which the data needs to be written or from which the data needs to be read. Traditionally, memory structures provide for a single pointer such that either a writing operation or a reading operation can be performed at one time. When the data needs to be read from the memory or written to the memory, the pointer may be virtually associated with a specific memory space or page to facilitate operations in accordance with software application requests.

Unfortunately, there are a number of limitations associated with the aforementioned approach. First of all, the routine dedicated to performing the writing procedures locates a free page which may be used to store the data. This process may be rather time-consuming in terms of both time spent on identifying free spaces and time spent on moving the pointer to such free spaces to perform the writing operations. Furthermore, storage techniques may involve finding pages, in close proximity to each other, to store data consecutively. In light of this, some data management schemes utilize rewriting procedures for rewriting portions of the data from one location to another such that all of the data is located together. This procedure is oftentimes not only time-consuming, but may also cause errors or result in a data loss.

Another disadvantage of present-day memory structures relates to the problem of storing large data objects on multiple disk drives (e.g., a redundant array of independent disks (RAID)). Data objects can be distributed across multiple disk drives via "RAID levels," depending on the level of redundancy and performance required. Accordingly, in some circumstances, data objects can be split into a plurality of parts, each of which may be stored individually on the same or different disks. This approach leads to the increase of time necessary for data addressing since paged memory is implemented in such a way that only one pointer can be addressed to a single memory page at the same time. It means a single medium cannot provide parallelism in accessing multiple data objects or their parts.

Hence, there is still a need for improvements in memory-management schemes to increase the data writing and reading speeds and integrity of stored data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect, a computer-implemented method of managing data within one or more data storage media is provided. The method may comprise creating a data structure within the one or more data storage media, the data structure including a plurality of memory pages, wherein each memory page comprises a plurality of sessions, each session comprising a header and a plurality of data objects. The method may further comprise writing data to the one or more data storage media, in response to routine requests such that the data is recorded to the one or more data objects in a sequential manner.

In various embodiments, the header of each session may comprise one or more data object identifiers, the data object identifiers being uniquely associated with the data objects, and wherein the one or more data object identifiers include a hash of the corresponding data objects, a length of the data object, an optional timestamp and/or a sequence number of the data object, and a sequence number of the entire session. The header may further comprise one or more hash values associated with the data stored in the one or more data objects. Each memory page can be of a predetermined and fixed length. Each session can have a variable and customizable length. The method may further comprise creating memory page binders for virtual binding of two or more pluralities of memory pages, the memory page binders may be stored in a descriptor (e.g., in a specialized object within one of the pages, or in the header) and describing how pluralities of memory pages are linked and how they can be accessed as a whole. The above-mentioned two or more pluralities of memory pages can be referred to as two or more data storage media. The data can be written to the plurality of data objects of one or more sessions until the memory page is full. The method may further comprise performing a data search within the memory pages, in response to routine requests, wherein the data search further comprises searching through the data object identifiers.

According to another aspect, a computer system for data management in one or more data storage media is provided.

The system may comprise a data structure generator configured to create a data structure in the one or more data storage media, the data structure including a plurality of memory pages, wherein each memory page comprises a plurality of sessions, each session comprising a header and a plurality of data objects. The system may also comprise a writing module configured to write data to the one or more data storage media, in response to routine requests, such that the data is recorded to the one or more data objects in a sequential manner.

According to yet another aspect, there is provided a processor-readable medium having instructions stored thereon. The instructions, when executed by one or more processors, cause the one or more processors to create a data structure within the one or more data storage media, the data structure including a plurality of memory pages, wherein each memory page comprises a plurality of sessions, each session comprising a header and a plurality of data objects, and enabling writing data to the one or more data storage media, in response to routine requests, such that the data is recorded to the one or more data objects in a sequential manner.

According to yet another aspect, there is provided a method of writing data to one or more data storage media, the one or more data storage media comprising a data structure which includes a plurality of memory pages, wherein each memory page comprises a plurality of sessions, and each session comprises a header and a plurality of data objects. The method may comprise receiving a routine request to write data, determining the current location of a virtual cursor, determining a location of one or more free sessions in the memory page nearest to the current location of the virtual cursor, and writing data to one or more data objects of the one or more free sessions such that, upon writing the data, the virtual cursor is moved through the data objects within a single memory page and in a single direction.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of the various aspects may be employed, and this description is intended to include all such aspects and their equivalents. Further embodiments and aspects will be apparent from the following description.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
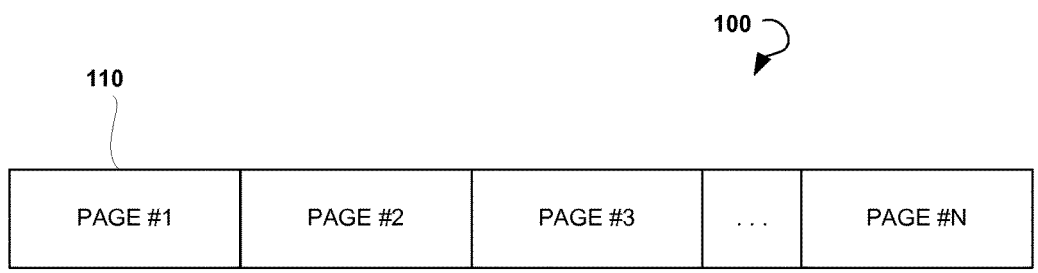
FIG. 1 shows a simplified structure of paged memory.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

Introduction

The approaches for managing data in one or more data storage media, as described herein, involve creating a data structure within the one or more data storage media. The one or more data storage media, memory such as, for example, a hard disk drive or a solid-state drive may comprise a plurality of memory pages to store data. A memory page, also referred to herein as a "journal page", is a fixed-length contiguous block within the memory. Memory pages are components of a memory-management scheme referred to herein as "paged memory."

Each memory page may comprise a variable number of sessions, or, in other words, allocated parts of the memory page. According to various embodiments, each session has a space to store a header and a space to store data objects. The space to store data objects is also referred to herein as a data zone.

The header of each session may include information associated with each data object stored in the data zone of this session. For example, the header may store data object identifiers, which may include one or more addresses of the corresponding data object, a length of the data object, and a timestamp and/or a sequence number of the data object. The identifier may include a unique hash of contents stored in the data object(s). Thus, each data object may be uniquely identified in the header of the session. Furthermore, the header of each session may include a sequence number of the session.

One of the advantages provided by the approaches described herein is to ensure a faster speed of writing new data to the memory. For this purpose, the memory may be provided with a virtual pointer to point to a memory page which was used for storing data. Additionally, a virtual cursor showing where the last writing session stopped can be used within a single memory page. The virtual cursor may be moved within the session, as well as within the memory page, from one data object to another to facilitate writing or reading data. The pointer may move in a cyclical way such that the pointer can return to the beginning of the page, for example, when the page is to be considered effectively erased and re-written.

The virtual cursor can move in one direction only within a memory page, for example, in the forward-only direction from the lowest address to the highest address (or, vice versa in a backward-only direction). Moving the virtual cursor allows decreasing the time needed to search for the free space within the memory page. As already mentioned above, when the data is stored in a session, it is stored as one or more data objects in the data zone and is uniquely identified in the header. When a writing command is received, before the new data is stored to the new session, it should be determined whether the memory page has some free space. Thereafter, the virtual cursor may be moved forward to the nearest location ready to store the data, i.e. the nearest free zone. The nearest free location may be determined by checking information stored in the header, or, more specifically, the data object identifiers. Any new data can be written directly to the free space past the current location of the virtual cursor. Therefore, new data may be written to one or more new sessions within the remaining free space.

The memory page size can be fixed. The memory sessions may have a predetermined fixed length, such that a certain number of sessions may be "embedded" into the memory page. Additionally, the size of the session may be customizable depending on the current needs. In certain embodiments, the size of each data object within each memory page may vary, and, therefore, data object sizes may be adapted to store data that varies in length.

A further advantage provided by the approaches proposed herein is to ensure parallelism in accessing multiple data objects or their parts. For this purpose, data objects can be stored in different sessions of the memory page or even different memory pages of one or more storage media (i.e., disks). In this case, multiple memory pages can be tied together with the help of binders, which can be stored, for example, in other specific data objects such as binder descriptors. In other words, the binders may combine various independently managed pluralities of memory pages related to one or more data storage media to represent a single storage pool. In certain embodiments, the storage media may have multiple binders so that memory pages related to different binders may be accessed independently thereby providing the parallelism. Each contiguous group of memory pages within a binder is referred to as a binder section. A binder may have one or more such binder sections.

Accordingly, each binder section may provide an independently managed storage pool. The binder may combine multiple storage pools that are independently managed, i.e. binder sections, and make them appear logically as a single storage pool. In some instances, the binders can also be used to group the binder sections to identify which ones are tied together in some way. This may allow software to make decisions about where it needs to store copies of data objects to keep them safe. For example, data objects can be replicated and each copy can be stored on several different binders. This may also allow seeing which storage resources can be used in parallel and which cannot be used in parallel.

In some example embodiments, data objects can be replicated and each copy can be stored on different binders, which are independently managed as discussed above. Thus, integrity of stored data is enhanced since failure of a single medium would not lead to loss of all data. In some approaches, it would even be advantageous to separate data objects and store them independently on multiple data storage media with the help of binders. The binders in this case would link all memory pages comprising these data objects to facilitate their further extraction, access or modification.

Thus, the approaches proposed herein eliminate the time-consuming operations related to the allocation of memory pages or sessions for new data and accessing the memory pages or sessions.

It should be also appreciated by one of ordinary skill in the art that the approach proposed herein may facilitate increasing the data management speed. The following is a detailed description of various embodiments related to methods and systems for generating and managing hierarchical data structures.

Data Structure

Referring now to the drawings, FIG. 1 shows a simplified structure of paged memory 100. As shown in the figure, the paged memory 100 may comprise a plurality of memory pages 110. A memory page or, oftentimes referred to as a "journal page" is a fixed-length contiguous block of memory such as a hard disk drive. In some applications, the length of the memory pages may be customized depending on the current needs. The length may vary from one memory page to another, although memory pages of one length are also possible. The number of memory pages may be limited and depend on the available physical space of memory.

Figure 2:
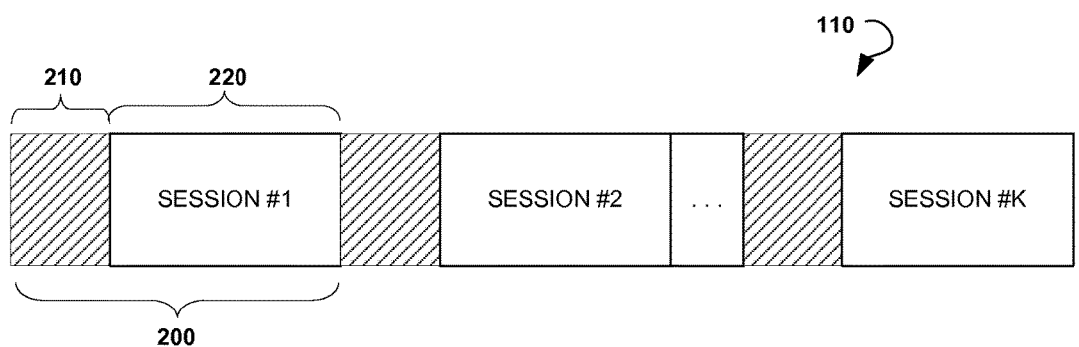
FIG. 2 shows a simplified structure of memory page.

FIG. 2 shows a simplified structure of memory page 110. The memory page 110 may comprise the one or more memory sessions 200 or, in other words, allocated parts of the memory pages. The memory sessions 200 may have a predetermined fixed length such that a certain number of sessions may be "embedded" into a memory page 110. For example, 1024 bits of data may be used for allocating a session 200 within the memory page 110. However, it should be appreciated that the size of sessions 200 may be customizable depending on the current needs.

Each memory session 200 may include a header 210 and a data field 220. The header 210 may comprise service data to identify the session 200 and data stored in the data field 220. The header 210 may also comprise additional information, such as check sums or hash functions, or any other information facilitating addressing and processing data within memory session 200. In some additional embodiments (not shown), one header 210 may be provided for the entire memory page 110 and all sessions 200.

Figure 3:
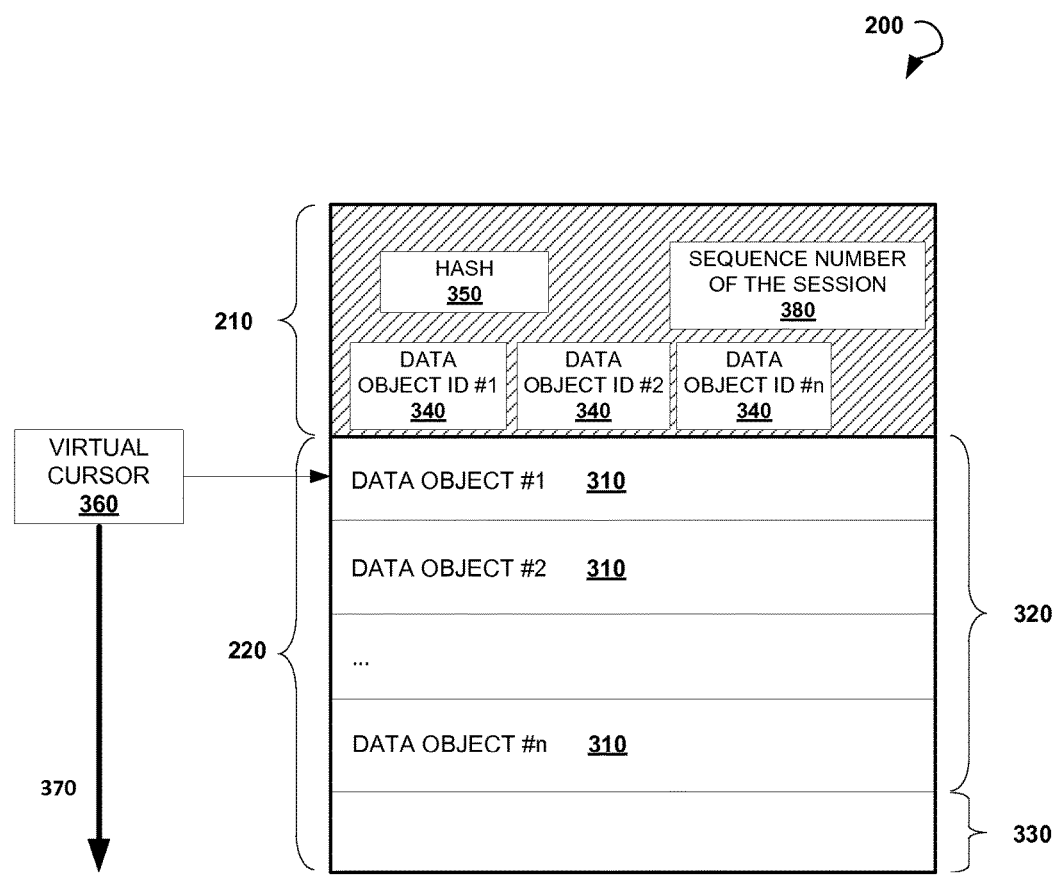
FIG. 3 illustrates a simplified structure of session.

FIG. 3 illustrates a simplified structure of the memory session 200. As shown in the figure, the memory session comprises a header 210 and a data field 220.

The data field 220 is configured to store data such as data object 310. Each data object may be of any length, but smaller than the size of the data field 220 of the corresponding session 200. If the data objects 310 do not fill all the space of the data field 220, the session 200 may comprise an alignment padding zone 330 at the end of data field 220 to occupy space between the data objects 310 and a natural alignment boundary. Specifically, the data in the session 200 may be aligned by inserting some meaningless bytes between the end of the last data object 310 and the end of the session 200, i.e. the end of the data field 220. Hence, each session 200 may include three zones: the header 210, data zone 320, and alignment padding zone 330.

The header 210 may include the one or more data object identifiers 340. The data object identifiers 340 may be uniquely associated with and identify corresponding data objects 310. Each data object identifier 340 may be of a predetermined size, for example, 64 or 160 bits. However, in some additional embodiments, the data object identifier 340 may be of a variable length depending on current needs or application.

By way of an example, each data object identifier 340 may include one or more of addresses of the corresponding data objects 310, information associated with a type of the data objects 310, information associated with the length of data objects, a timestamp and/or a sequence number of a data object. Those skilled in the art would appreciate that any additional data may be stored in the data object identifiers 340 to identify the data objects 310 or describe their properties.

The header 210 may include a sequence number 380 of the session 200 may indicate a time or relative ordering when the session 200 comprising the data objects 310 was written to the memory page. The hash of the header may verify that a valid session header exists, and the sequence number may distinguish old sessions from new sessions. Thus, by reading the sequence number, the quantity of sessions written to the memory page and a size of a free space left in the memory page may be determined. Furthermore, by reading the sequence number, a free space map can be verified and/or rebuilt, at once or incrementally. The free space map may not need to be updated after every write operation, since in case of a crash, the free space map may be recovered by going back to the last full version and incrementally reading the additional memory pages to determine the changes.

In certain embodiments, by reading the sequence number of the data objects 310, it may be determined which data objects are new (i.e., data objects in new sessions) to establish which data objects have been replaced by new objects and, therefore, can be disposed of. Determining which data objects are new may allow eventual deletion of memory pages with no data worth saving. In an example embodiment, this step may involve compacting the data objects by re-writing the data objects worth saving to another memory page. In instances where the data objects do not have their own sequence numbers, the sequence number of the session 200 may serve as the sequence number for all data objects described therein. Even when the data objects have their own sequence numbers, these are often equivalent to the sequence number of the session when the data objects are first written, but may become different if those data objects are later copied to other newer sessions.

Furthermore, based on the sequence number, the memory pages may be erased and rewritten without persisting an update to the free space map and without deleting the entire memory page. For example, any data that follows the newly written session will either not have a valid header on the session, or will have an older sequence number. Therefore, writing a new session, of any size, to a memory page may automatically invalidate the remaining data, i.e. the data following the newly written session, in the memory page.

The header 210 may further comprise one or more hash values 350 associated with the data stored in the one or more data objects 310. In some embodiments, there is only one hash value 350 in the header which can be associated with the whole amount of the data stored in the session 200, while in some other embodiments the header 210 may comprise a separate hash values 350 for each data object 310 stored in the session 200. In such embodiments, a separate hash value 350 may independently provide the integrity check for just the session header including the IDs, types, and sizes of the objects, as well as the sequence number of the session. In addition, the data object IDs themselves may serve as their own hashes for their contents when using a content-addressable storage scheme for the data objects. In this manner, the single hash for the session can be used to independently verify the integrity of the session header as well as indirectly verify the full integrity of the entire session, including all data objects. Furthermore, in some embodiments, the hash value 350 may include a hash of a binder section that is an ID of the entire binder section. The hash of the binder section may enable reformatting the binder section by changing the ID of the binder section.

When data from the one or more data objects 310 is addressed to be read or rewritten, or when the data is to be written to the session 200, a virtual cursor 360 may first read what is included into the header 210 and, in particular, in the data object identifiers 340, and, based on the obtained data, position the virtual cursor 360 to a certain position within the data field 220 to enable reading or writing of data.

The virtual cursor 360, as used herein, refers to a virtual tool for addressing a certain field or zone within the memory sessions 200. According to the various embodiments disclosed herein, the virtual cursor 360 may move in a single direction only. For example, within a single reading/writing operation, the virtual cursor 360 may move in the direction 370 which is from the lowest addresses toward the highest ones, or vice versa. Accordingly, all of the data objects to be written in a given session should be prepared in advance, since this may allow the header describing all of them to be written first, followed by the data objects, and ensure that the cursor does not need to move backwards to overwrite the header later or to write the contents out of order. If more data objects should later need to be appended to a page, another session may be written.

Computing Environment and Data Management System

Figure 4:
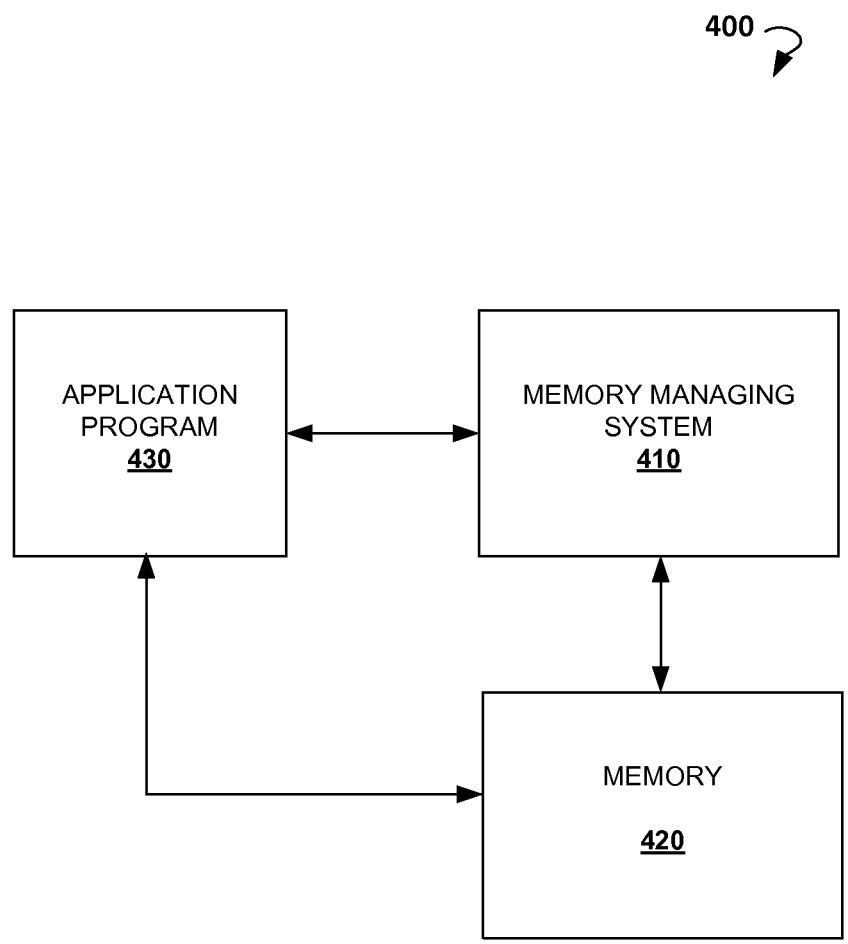
FIG. 4 shows a computing environment suitable for employment of methods for managing data.

FIG. 4 shows a computing environment 400 suitable for employment of data management methods. The computing environment 400 comprises a data management system 410, a memory 420, and an application program 430.

Generally, the memory 420 may be of any type and configured to store data. The memory 420, as used herein, may also be referred to as a data storage medium. In some embodiments (not shown), the computing environment 400 may include multiple memories 420 which can be interrelated and located within a single computing device or may be distributed over multiple computing devices (e.g., via a network such as the Internet or the like).

The application program 430 may be any routine running on the same computer or any other external device. The application program 430 may generate requests to manage the data within the memory 420. Data management may include writing or reading of data. Accordingly, the application program 430 may generate instructions to manage the data within the memory 420 and send the instructions to the data management system 410. The instructions may include writing or reading instructions.

The data management system 410 may handle these instructions received from the application program 430. The data management system 410 may be configured to create data structure in the memory data management system 410, enable to write, read, and replace the data in the memory 420, move the virtual cursor 360 in a single direction, and so on.

Figure 5:
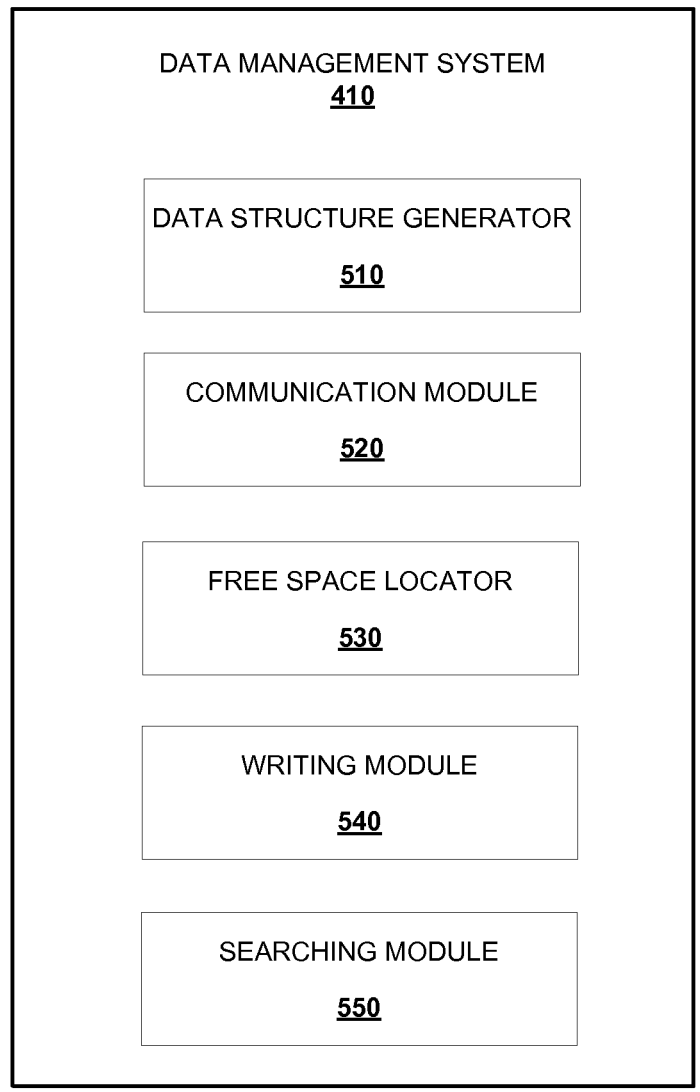
FIG. 5 shows the data management system.

FIG. 5 shows the data management system 410. As shown in the figure, the data management system 410 may include a data structure generator 510, a communication module 520, a free space locator 530, a writing module 540, and a searching module 550. These modules are discussed below in greater details.

The data structure generator 510 can be configured to create a data structure in the memory 420. The data structure may include a plurality of memory pages, and each memory page may have a plurality of sessions as discussed above. Each session, in turn, may include a header 210 and a plurality of the data objects 310. Moreover, the header 210 of each session 200 may have one or more data object identifiers 310, which may be associated with the data objects 310. As mentioned before, the data object identifiers 340 may include one or more addresses of the corresponding data object, type of data object, length of data object, a timestamp and/or a sequence number of data object, and a sequence number of the session 200.

The communication module 520 may be configured to receive routine requests from the application program 430. The routing requests may relate to instructions to write, read, or replace portions of the data. The communication module 520 may be further configured to transmit the results of such instructions having been executed and/or the retrieved data.

The free space locator 530 may be configured to determine the current location of the virtual cursor 360 and determine the location of free space for one or more new sessions 220 nearest the current location of the virtual cursor 360. In certain embodiments, a selection of the start of free space may be based on directly reading the contents of the memory page. Specifically, through examination of the session headers, the free space remaining can be determined in the absence of such knowledge from the free space locator. Furthermore, data objects to be written may be sorted into different sections based on type, age, expected expiration time of the data objects, and so forth.

The writing module 540 may be configured to write data to the memory 420 in response to routine requests received from the application program 430. The data may be written as one or more data objects 310 nearest the current location of the virtual cursor 360. During the writing process, the virtual cursor 360 is moved within memory page 110 and in a single direction 370. The forward-only direction of writing of the data objects within the memory page may be advantageous to avoid performing a read/modify/write operation on any of the existing content. In particular, this approach may allow avoiding reading prior to writing. Furthermore, this approach improves data integrity, since there is no risk of overwriting existing data with new data. Therefore, there is no need to be concerned with race conditions that may result with two write operations competing for the same data space. In other words, the data may be only ever written once, with any new data written to another section of the memory page.

In certain embodiments, an older version of a data object may exist for some time even after a new version has been successfully written. This will allow sufficient time to validate the integrity of the new version before deleting the old version. Furthermore, the old version of the data object may be referred to for as long as necessary, thus eliminating locking and race conditions. The old version may be removed after there it is no longer needed because it has been successfully deprecated by the new version.

Finally, the searching module 550 may be configured to search data or data objects within sessions 200 and memory pages 110, in response to routine requests received from the application program 430. The data search may be based on searching through the data object identifiers 340.

Operation Examples

Figure 6:
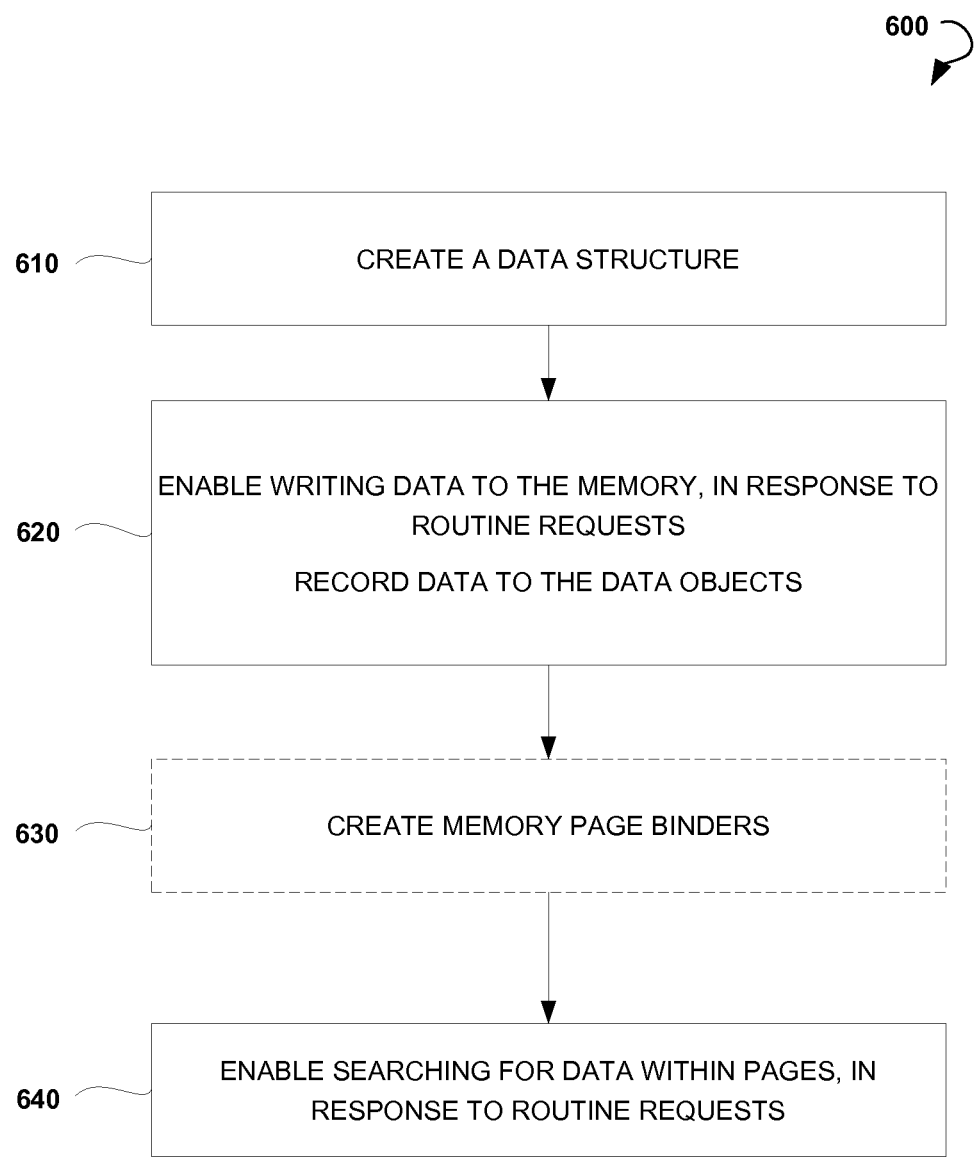
FIG. 6 is a process flow diagram showing a method for managing data in a memory.

FIG. 6 is a process flow diagram showing a method 600 for managing data in one or more memories. The method 600 may be performed by logic that may comprise hardware (e.g., dedicated logic, programmable logic, and microcode), software (such as software run on a general-purpose computer system or a dedicated machine), or a combination of both. In one exemplary embodiment, the processing logic resides at the data management system 410 and the various modules of the data management system 410 may perform the method 600. It will be appreciated by one of ordinary skill that examples of the foregoing modules may be virtual, and instructions said to be executed by a module may, in fact, be retrieved and executed by the data management system 410. Although the various modules may be configured to perform some or all of the various steps described herein, fewer or more modules may be provided and still fall within the scope of various embodiments.

As shown in FIG. 6, the method 600 may commence at operation 610 with the data structure generator 510 creating a data structure in the memory 420 (data storage medium or, in some embodiments, in data storage media). As mentioned previously, the data structure includes a plurality of memory pages and each memory page may have a plurality of sessions, while each session has a header 210 and a plurality of data objects 310. The header 210 of each session 200 may embed one or more data object identifiers 340 associated with the data objects 310. Moreover, the data object identifiers 340 may include one or more addresses of the corresponding data object, type of data object, length of data object, and/or timestamp of data object.

At operation 620, the writing module 540 enables writing data to the memory 420 in response to routine requests. The data is recorded as one or more data objects in a sequential manner. In certain embodiments, the data can be stored at the location of virtual cursor 360, which can be placed right after the latest data object 310 stored in the past.

The method 600 may optionally include an operation 630 of creating memory page binders. The memory page binders may be created with respect to two or more pluralities of memory pages related to one or more interrelated memories 420. Each contiguous group of memory pages within the memory page binder can be referred to as a binder section. The memory page binders may combine multiple storage pools that are independently managed, i.e. binder sections, appearing logically as a single storage pool. The memory page binders may be stored in the header 210.

The method 600 may include an operation 640 that allows searching the data within memory pages 110, in response to routine requests received from the application program 430. The data search may consist of searching through the data object identifiers 340.

Figure 7:
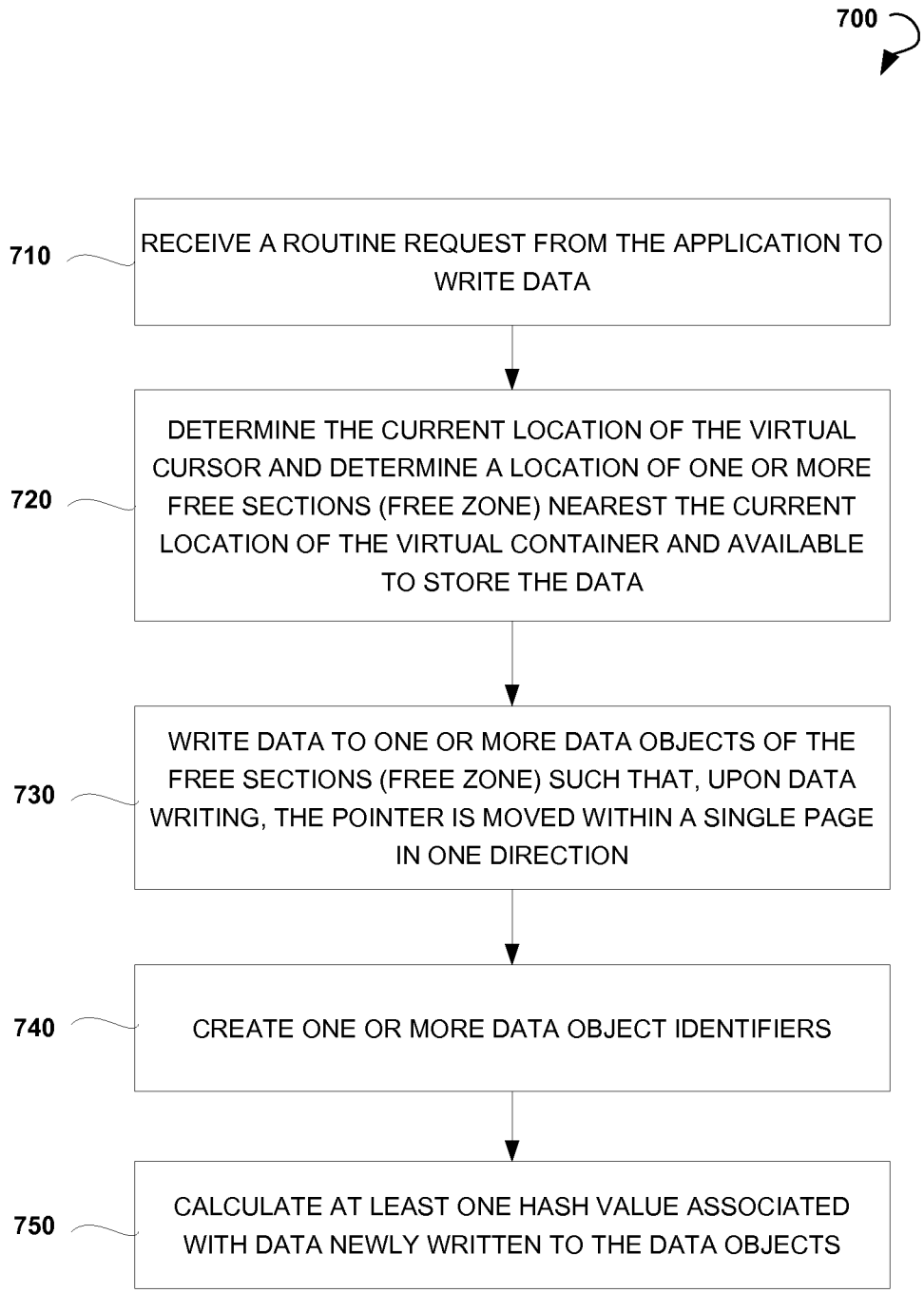
FIG. 7 is a process flow diagram showing a method for writing data to a memory.

FIG. 7 is a process flow diagram showing a method 700 for writing data in a memory or interlinked memories. The method 700 may be performed by logic that may comprise hardware (e.g., dedicated logic, programmable logic, and microcode), software (such as software run on a general-purpose computer system or a dedicated machine), or a combination of both. In one exemplary embodiment, the processing logic may reside at the data management system 410 and the various modules of the data management system 410 may perform the method 700. It will be appreciated by one of ordinary skill that examples of the foregoing modules may be virtual, and instructions said to be executed by a module may, in fact, be retrieved and executed by the data management system 410. Although the various modules may be configured to perform some or all of the various steps described herein, fewer or more modules may be provided and still fall within the scope of various embodiments.

The method 700 may be performed within a paged memory data structure. Such data structure, as mentioned previously, may include a plurality of memory pages 110 and each memory page 110 may include a plurality of sessions 200. Each session 200 may comprise a header 210 and a plurality of the data objects 310. The header 210 of each session 200 may embed one or more data object identifiers 340 as discussed above. Such data object identifiers 340 may be uniquely associated with the data objects 310 and may include addresses of the corresponding data objects, types of data objects, lengths of data objects, and timestamps and/or sequence numbers of data objects.

As shown in FIG. 7, the method 700 may commence at operation 710 with the communication module 520 receiving a routine request from the application program 430 to write data.

At operation 720, the free space locator 530 may determine the current location of virtual cursor 360. The free space locator 530 may also determine the free session 200, (the session that has a free data field 220), and specifically the beginning of the data field 220. In other words, the free space locator 530 locates the location being nearest to the current location of the virtual cursor 360 and available to store new data. In certain embodiments, the memory page may comprise a free space between the last session written to the memory page and the end of the memory page. The free space may be used for new sessions to be written to the memory page. The memory pages may be of a fixed size, while sessions may be of variable lengths and may include a number of data objects to be written to the session within the page.

At operation 730, the writing module 540 writes data to the data field 220 such that, during the writing operation, the virtual cursor 360 is moved within the memory page in the single direction 370. A session may be closed out after the data is written without any further modifications. If further data objects need to be written, a new session may be created. Sessions may be written to the memory page until the memory page is full.

At operation 740, the writing module 540 creates one or more data object identifiers 340 in the header 210. Each data object identifier 340 is associated with the corresponding data object 310 and data contained therein.

At operation 750, the writing module 540 calculates at least one hash value associated with the newly added data written to the data object(s) 310. The calculated hash values 350 are stored in the header 210. The hash of the header 210, except for one integrity-check field, may be computed and stored in an integrity-check field of the header 210. In this way, the integrity of the entire session can be checked.

Example Memory Page Layout

Figure 8A:
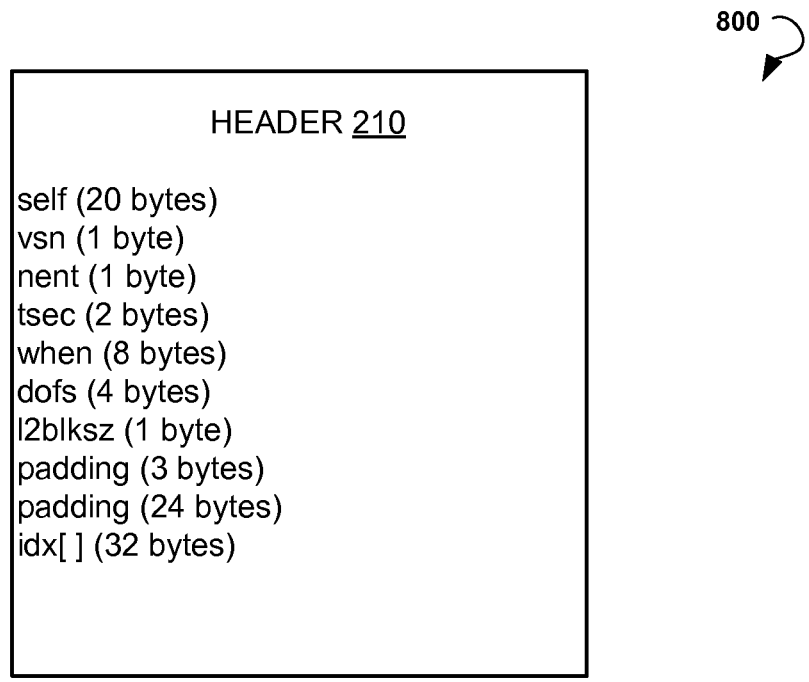
FIG. 8A is a diagram showing an example memory page layout.

FIG. 8A an example memory page layout, also referred to as a journal page map. In a sample embodiment, a header 210 of a session may include the following values:
  self (20 bytes) is a Secure Hash Algorithm 1 (SHA1) hash of the journal page map (not including "self") processed by the logical operator XOR with a binder section ID; may serve both as an integrity check for the entire session and to distinguish valid session headers for a given binder section from other random data;
  vsn (1 byte) is major binary compatibility release number;
  nent (1 byte) is a number of entries the journal page map adds (not total in session or journal page; a session may have multiple journal page maps if needed; logically they act as one big journal page map)
  tsec (2 bytes) is a number of sectors (512 to 8192 bytes each) used by the journal page map and the data following the journal page map (offset for next journal page map);
  when (8 bytes) is a "timestamp-like" sequence number; this value is guaranteed to always advance for the set of disks on a given box, but otherwise is derived from real time in nanoseconds (i.e. an offset may be added if the time is set backwards to ensure this number only goes up, not down);
  dofs (4 bytes) is data offset indicative of where the data objects begin relative to the start of the session, in bytes, thus allowing the data objects to be either sector aligned, or tightly packed after the index entries (the end of the journal page map);
  l2blksz (1 byte) is a base-2 logarithm of the maximum block size;
  padding (3 bytes) is a padding of unused space, which could be used to describe larger sizes of a block;
  padding (24 bytes) is a padding for future purposes;
  idx[ ] is an array of 1 or more 32-byte index entries, as described below with regards to FIG. 8B.

Figure 8B:
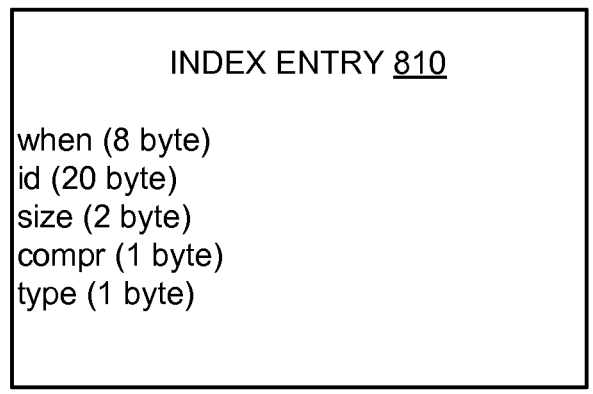
FIG. 8B is a diagram showing an example index entry layout for a data object.

FIG. 8B is a diagram of an example index entry layout for each data object, also referred to as a journal page index. In FIG. 8B, an index entry layout may include the following index entries 810:
  when (8 byte) is a "timestamp-like" sequence number and has the same units as the session "when" field. This value may often have the same value as the session "when" upon initial write of new data objects until the data objects are shuffled;
  id (20 byte) is a SHA1 hash of data contents of the data object;
  size (2 byte) is a size of data (up to 65535 bytes max). This value may represent a full 64 K (65536 bytes), where size 0 can mean 64K;
  compr (1 byte) may describe any compression or special encoding used for the data object;
  type (1 byte) may inform the high-level type of the data object, including the overall metatype of the data object as the high 4 bits, and the low 4 bits of metatype-specific subtype information (data, directory, inode, pointer-block, etc; metatype 0 is intended for journal page internal use).

Example Computing Means

Figure 9:
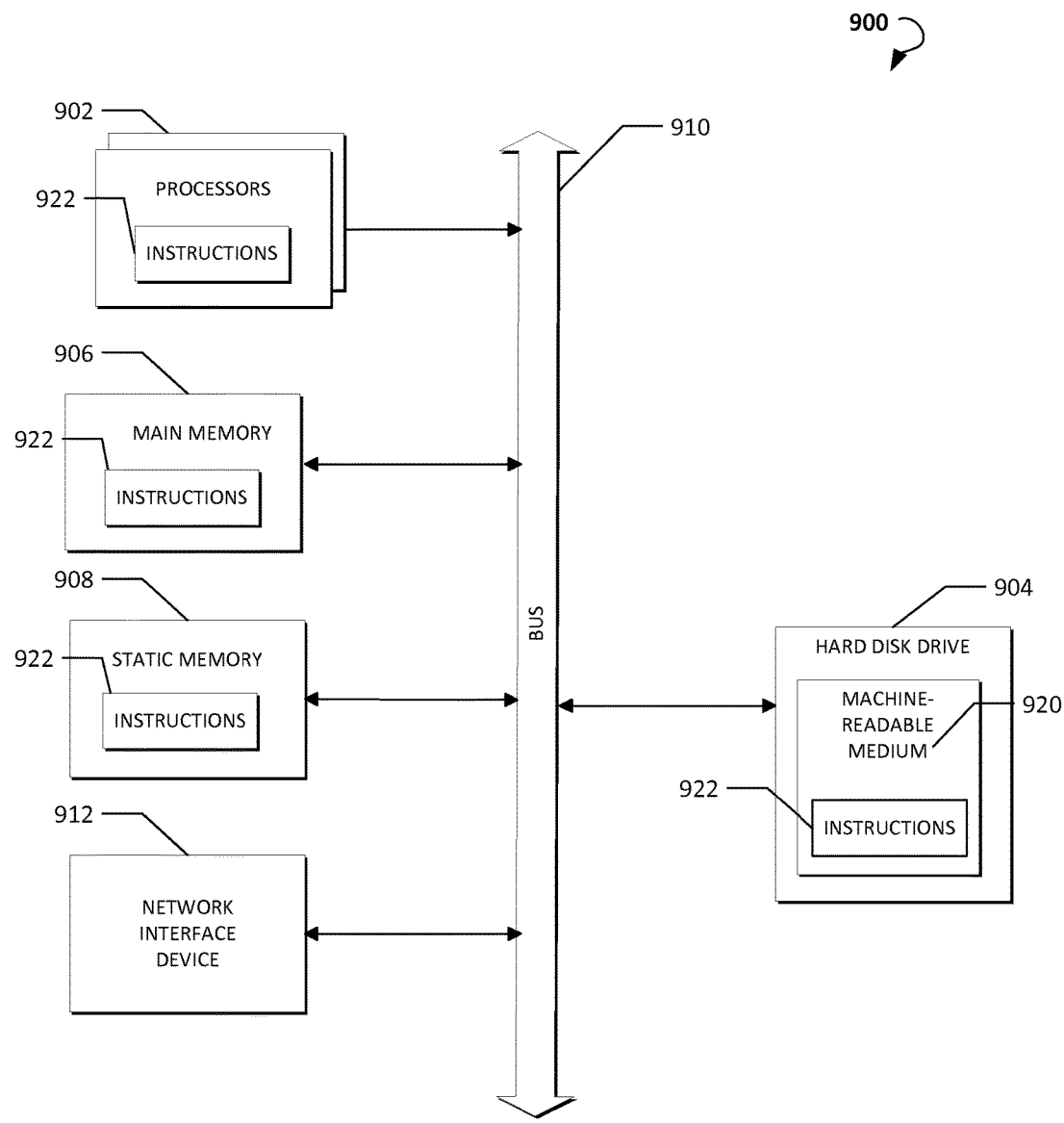
FIG. 9 shows a diagrammatic representation of a computing device for a machine in the example electronic form of a computer system, within which a set of instructions for causing the machine to perform any one or more of the methodologies discussed herein can be executed.

FIG. 9 shows a diagrammatic representation of a computing device for a machine in the example electronic form of a computer system 500, within which a set of instructions for causing the machine to perform any one or more of the methodologies discussed herein may be executed. In various exemplary embodiments, the machine operates as a stand-alone device or it may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902, a hard disk drive 904, a main memory 906 and a static memory 908, which communicate with each other via a bus 910. The computer system 900 may also include a network interface device 912. The hard disk drive 904 may include a computer-readable medium 920, which stores one or more sets of instructions 922 embodying or utilized by any one or more of the methodologies or functions described herein. The instructions 922 can also reside, completely or at least partially, within the main memory 906 and/or within the engines 902 during execution thereof by the computer system 900. The main memory 906 and the engines 902 also constitute machine-readable media.

While the computer-readable medium 920 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, NAND or NOR flash memory, digital video disks, random access memory (RAM), read only memory (ROM), and the like.

The exemplary embodiments described herein may be implemented in an operating environment comprising computer-executable instructions (e.g., software) installed on a computer, in hardware, or in a combination of software and hardware. The computer-executable instructions may be written in a computer programming language or may be embodied in firmware logic. If written in a programming language conforming to a recognized standard, such instructions may be executed on a variety of hardware platforms and for interfaces to a variety of operating systems. Although not limited thereto, computer software programs for implementing the present method may be written in any number of suitable programming languages such as, for example, C, C++, C# or other compilers, assemblers, interpreters or other computer languages or platforms.

Thus, computer-implemented methods and systems for managing data in a data storage medium are described. Although embodiments have been described with reference to specific exemplary embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method of managing data within one or more data storage media, the method comprising:
   creating, by a processor, a data structure within the one or more data storage media, the data structure including a plurality of memory pages, wherein each memory page comprises a plurality of sessions, each session comprising a session header and a data field configured to store a plurality of data objects;
   moving, in response to a write request of particular data, a virtual cursor in only one direction within the memory page until the virtual cursor is located at the session header of a free session of the plurality of sessions in which the virtual cursor stops at the session header of the free session based on the data field of the free session that is available to store the particular data and in which the virtual cursor is configured to only move in the one direction;
   writing, while the virtual cursor is located at the session header of the free session and prior to storing the particular data in the data field of the free session, one or more data object identifiers related to storage of data objects of the particular data in the header of the free session;
   moving the virtual cursor in the one direction from the session header of the free session to a particular position within the data field of the free session based on information read from the session header of the free session; and
   enabling, by the processor, writing the particular data to the data field of the free session starting at the particular position within the data field based on the virtual cursor being at the particular position, in which during all writing of the particular data in the data field of the free session the virtual cursor is moved in a sequential manner within the data field of the free session with the virtual cursor moving in the one direction within the data field of the free session, wherein after the particular data is written to the data field of the free session, no other information regarding the writing of the particular data to the data field of the free session is written to the session header of the free session or any preceding session of the plurality of sessions that precedes the free session with respect to movement in the one direction moved by the virtual cursor;
   wherein each of the session headers includes a first hash value of a binder section, second hash values being individually associated with the plurality of data objects of the corresponding session and a sequence number of the corresponding session, wherein the binder section includes two or more memory pages bound by a memory page binder, in which the memory page binder is stored in a descriptor, the memory page binder describing how the two or more memory pages are bound and how the two or more memory pages can be accessed, the first hash value being an identifier of the binder section and enabling verifying integrity of the session header of the corresponding session and integrity of the sequence number of the corresponding session, and wherein each of the second hash values is a data object identifier of one of the plurality of data objects of the corresponding session.

2. The method of claim 1, wherein each of the data object identifiers includes an address of the corresponding data object, a length of the corresponding data object, a timestamp and a sequence number of the corresponding data object, and a sequence number of the session.

3. The method of claim 1, further comprising determining that the data field of the free session is available to store the particular data based on one or more sequence numbers of the free session.

4. The method of claim 1, wherein each memory page is of a predetermined and fixed length.

5. The method of claim 1, wherein each of the sessions has a variable and customizable length.

6. The method of claim 1, wherein the particular data is represented as data packets.

7. The method of claim 1, further comprising creating, by the processor, the memory page binder, wherein the memory page binder virtually binds two or more of the plurality of memory pages into a single storage pool.

8. The method of claim 7, wherein the two or more of the plurality of memory pages are stored on two or more data storage media.

9. The method of claim 1, further comprising performing, by the processor, a data search within the memory pages, in response to requests, wherein the data search further comprises searching through the data object identifiers.

10. A computer system for data management in one or more data storage media, the system comprising:
   a data structure generator configured to create a data structure in the one or more data storage media, the data structure consisting of a plurality of memory pages, wherein each memory page comprises a plurality of sessions, each session comprising a session header and a data field configured to store a plurality of data objects; and
   a writing module configured to write to a free session of the plurality of sessions, in response to a write request of particular data, such that during all writing performed in response to the write request one or more data object identifiers of the particular data is recorded by a virtual cursor to the session header of the free session and the particular data is written to the data field of the free session that is sequentially located after the session header of the free session in a sequential manner with the virtual cursor moving in a forward-only direction within the free session and without the virtual cursor moving backward within the free session, wherein after the particular data is written to the data field of the free session, no other information regarding the writing of the particular data to the data field of the free session is written to the session header of the free session or to any preceding session of the plurality of sessions that precedes the free session with respect to movement in the one direction moved by the virtual cursor, wherein each of the session headers includes a first hash value of a binder section, second hash values being individually associated with the plurality of data objects of the corresponding session and a sequence number of the corresponding session, wherein the binder section includes two or more memory pages bound by a memory page binder, in which the memory page binder is stored in a descriptor, the memory page binder describing how the two or more memory pages are bound and how the two or more memory pages can be accessed, the first hash value being an identifier of the binder section and enabling verifying integrity of the session header of the corresponding session and integrity of the sequence number of the corresponding session, and wherein each of the second hash values is a data object identifier of one of the plurality of data objects of the corresponding session.

11. The system of claim 10, wherein each of the data object identifiers includes an address of the corresponding data object, a length of the corresponding data object, a timestamp and a sequence number of the corresponding data object, and a sequence number of the corresponding session.

12. The system of claim 10, wherein the writing module is further configured to create the memory page binder for virtual binding of two or more of the plurality of memory pages to represent a single storage pool, the memory page binder stored in the session header of the corresponding session and identifying how the two or more of the plurality of memory pages are linked.

13. The system of claim 12, wherein the two or more of the plurality of memory pages are stored on two or more data storage media.

14. The system of claim 10, further comprising a searching module configured to search data within the memory pages, in response to requests, wherein the data search comprises searching through the data object identifiers.

15. A non-transitory processor-readable medium having instructions stored thereon, which when executed by one or more processors, cause the one or more processors to implement a method for managing data within one or more data storage media, the method comprising:
   creating, by a processor, a data structure within the one or more data storage media, the data structure including a plurality of memory pages, wherein each memory page comprises a plurality of sessions, each session comprising a session header and a data field configured to store a plurality of data objects; and
   enabling, by the processor, writing to a free session of the plurality of sessions, in response to a write request of particular data, such that during all writing performed in response to the write request one or more data object identifiers of the particular data is recorded by a virtual cursor to the session header of the free session and the particular data is written to the data field of the free session that is sequentially located after the session header of the free session in a sequential manner with the virtual cursor moving in a forward-only direction within the free session and without the virtual cursor moving backward within the free session, wherein after the particular data is written to the data field of the free session, no other information regarding the writing of the particular data to the data field of the free session is written to the session header of the free session or to any preceding session of the plurality of sessions that precedes the free session with respect to movement in the one direction moved by the virtual cursor, wherein each of the session headers includes a first hash value of a binder section, second hash values being individually associated with the plurality of data objects of the corresponding session and a sequence number of the corresponding session, wherein the binder section includes two or more memory pages bound by a memory page binder, in which the memory page binder is stored in a descriptor, the memory page binder describing how the two or more memory pages are bound and how the two or more memory pages can be accessed, the first hash value being an identifier of the binder section and enabling verifying integrity of the session header of the corresponding session and integrity of the sequence number of the corresponding session, and wherein each of the second hash values is a data object identifier of one of the plurality of data objects of the corresponding session.

16. A method of writing data in one or more data storage media, the method comprising:
   receiving a write request to write data in the one or more data storage media, the one or more data storage media comprising a data structure which includes a plurality of memory pages, wherein each memory page comprises a plurality of sessions, and each session comprises a session header and a data field configured to store a plurality of data objects, wherein each of the session headers includes a first hash value of a binder section, second hash values being individually associated with the plurality of data objects of the corresponding session and a sequence number of the corresponding session, wherein the binder section includes two or more memory pages bound by a memory page binder, in which the memory page binder is stored in a descriptor, the memory page binder describing how the two or more memory pages are bound and how the two or more memory pages can be accessed, the first hash value being an identifier of the binder section and enabling verifying integrity of the session header of the corresponding session and integrity of the sequence number of the corresponding session, and wherein each of the second hash values is a data object identifier of one of the plurality of data objects of the corresponding session;

determining a current location of a virtual cursor;

determining a location of a free session of the plurality of sessions nearest the current location of the virtual cursor; and writing to the free session of the plurality of sessions, in response to a write request of particular data, such that during all writing performed in response to the write request one or more data object identifiers of the particular data is recorded by the virtual cursor to the session header of the free session and the particular data is written to the data field of the free session that is sequentially located after the session header of the free session in a sequential manner with the virtual cursor moving in a single forward-only direction within the free session and without the virtual cursor moving backward within the free session, wherein after the particular data is written to the data field of the free session, no other information regarding the writing of the particular data to the data field of the free session is written to the session header of the free session or to any preceding session of the plurality of sessions that precedes the free session with respect to movement in the one direction moved by the virtual cursor.

17. The method of claim 16, wherein the particular data is represented as data packets.

18. The method of claim 16, further comprising creating the memory page binder for virtual binding of two or more of the plurality of memory pages to represent a single storage pool, the memory page binder stored in the session header of the corresponding session and identifying how the two or more of the plurality of memory pages are linked.

19. The method of claim 16, wherein the two or more of the plurality of memory pages are stored on two or more data storage media.

20. A computer system for writing data in one or more data storage media, the system comprising:

a communication module configured to receive a write request to write particular data in one or more data storage media, the one or more data storage media has a data structure which includes a plurality of memory pages, wherein each memory page comprises a plurality of sessions, and each session comprises a session header and a data field configured to store a plurality of data objects, wherein each of the session headers includes a first hash value of a binder section, second hash values being individually associated with the plurality of data objects of the corresponding session and a sequence number of the corresponding session, wherein the binder section includes two or more memory pages bound by a memory page binder, in which the memory page binder is stored in a descriptor, the memory page binder describing how the two or more memory pages are bound and how the two or more memory pages can be accessed, the first hash value being an identifier of the binder section and enabling verifying integrity of the session header of the corresponding session and integrity of the sequence number of the corresponding session, and wherein each of the second hash values is a data object identifier of one of the plurality of data objects of the corresponding session;

a free space locator configured to determine a current location of a virtual cursor and determine a location of one or more memory pages with a free space for a free session of the plurality of sessions remaining nearest the current location of the virtual cursor; and a writing module configured to write one or more data object identifiers related to storage of data objects of the particular data to the session header of the free session and to write the particular data to the data field of the free session that is sequentially located after the session header-of the free session such that, during all writing performed in response to the write request, the virtual cursor is moved through the session header of the free session and the data field of the free session in a single forward-only direction within the free session and without the virtual cursor moving backward within the free session and such that after the particular data is written to the data field of the free session, no other information regarding the writing of the particular data to the data field of the free session is written to the session header of the free session or to any preceding session of the plurality of sessions that precedes the free session with respect to movement in the one direction moved by the virtual cursor.

21. The system of claim 20, wherein the writing module is further configured to create the memory page binder for virtual binding of two or more of the plurality of memory pages, the memory pages binder stored in one or more session headers and identifying how the two or more of the plurality of memory pages are linked.

22. The system of claim 21, wherein the two or more of the plurality of memory pages are stored on two or more data storage media.

23. A non-transitory processor-readable medium having instructions stored thereon, which when executed by one or more processors, cause the one or more processors to implement a method of writing data in one or more data storage media, the method comprising:

receiving a write request to write particular data in one or more data storage media, the one or more data storage media has a data structure which includes a plurality of memory pages, wherein each memory page comprises a plurality of sessions, and each session comprises a session header and a data field configured to store a plurality of data objects, wherein each of the session headers includes a first hash value of a binder section, second hash values being individually associated with the plurality of data objects of the corresponding session and a sequence number of the corresponding session, wherein the binder section includes two or more memory pages bound by a memory page binder, in which the memory page binder is stored in a descriptor, the memory page binder describing how the two or more memory pages are bound and how the two or more memory pages can be accessed, the first hash value being an identifier of the binder section and enabling verifying integrity of the session header of the corresponding session and integrity of the sequence number of the corresponding session, and wherein each of the second hash values is a data object identifier of one of the plurality of data objects of the corresponding session;

determining a current location of a virtual cursor;

determining a location of one or more free sessions nearest the current location of the virtual cursor; and writing one or more data object identifiers related to storage of data objects of the particular data to the session header of the free session and writing the particular data to the data field of the free session that is sequentially located after the session header of the free session such that, during all writing performed in response to the write request, the virtual cursor is moved through the session header of the free session and the data field of the free session in a single forward-only direction within the free session and without the virtual cursor moving backward within the free session and such that after the particular data is written to the data field of the free session, no other information regarding the writing of the particular data to the data field of the free session is written to the session header of the free session or to any preceding session of the plurality of sessions that precedes the free session with respect to movement in the one direction moved by the virtual cursor.

* * * * *